B. O. FREDERICK.
VEHICLE BRAKE.
APPLICATION FILED MAR. 1, 1921.

1,423,846.

Patented July 25, 1922.

Inventor
Bernhard O. Frederick.
Geo. Swine
Attorney

UNITED STATES PATENT OFFICE.

BERNHARD O. FREDERICK, OF HIBBING, MINNESOTA.

VEHICLE BRAKE.

1,423,846.  Specification of Letters Patent.  Patented July 25, 1922.

Application filed March 1, 1921. Serial No. 448,750.

*To all whom it may concern:*

Be it known that I, BERNHARD O. FREDERICK, a citizen of the United States, residing at Hibbing, in the county of St. Louis and State of Minnesota, have invented certain new and useful Improvements in Vehicle Brakes, of which the following is a specification, reference being had therein to the accompanying drawing.

This invention relates to auxiliary brakes for vehicles such as automobiles or the like and has special reference to a brake principally actuated by the rotation of the wheels of the vehicle and one which when so actuated will tend to raise the wheels off of the ground.

The principal object of the invention is to provide a simple device of this character which will result in as effectual a brake as possible and one that will prevent skidding of the automobile when the brake is applied under abnormally slippery conditions.

Other objects and advantages will appear in the further description thereof.

In the accompanying drawing forming part of this application and in which like reference characters indicate like parts:

Figures 1, 2:
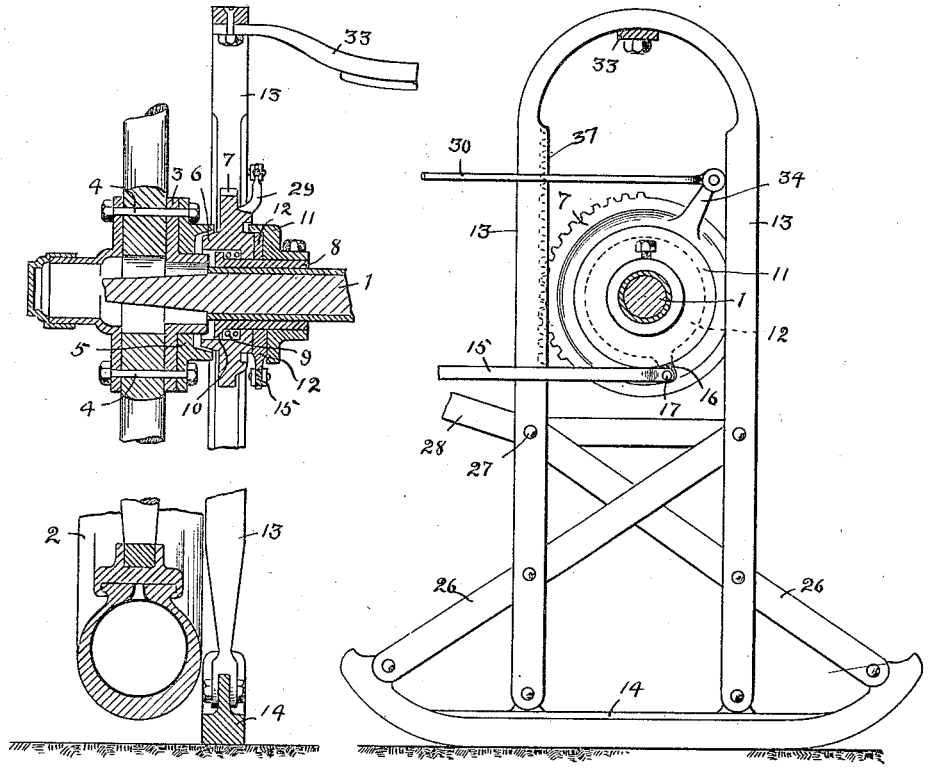
Figure 1 is a central vertical sectional view through one end of the rear axle of an automobile.
Figure 2 is a side elevation of Figure 1 looking outwardly in respect to the chassis of the automobile.
Figure 3:
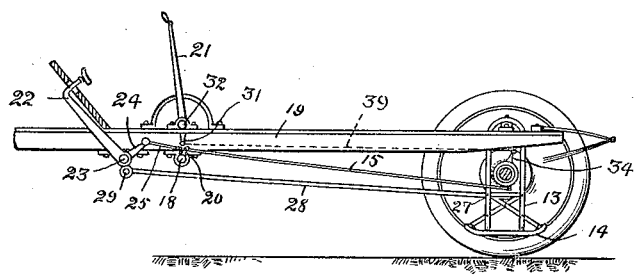
Figure 3 is a reduced elevation of the brake as applied to the rear end of an automobile and looking outwardly in respect thereto.

1 represents the driving axle of a vehicle to which the wheel 2 is non-rotatably attached as is customary in the rear portion of an automobile. To the inside of the wheel hub flange indicated at 3 is securely fastened in any desired manner as by through bolts 4 the internal or female portion 5 of a cone clutch, while the male portion of said clutch is carried upon the axle of the car and illustrated at 6, the same having formed integral therewith the gear wheel 7, it having cogs only upon the forward side thereof as illustrated in Figure 2. The gear and cone portion of the clutch is mounted upon a sleeve 8 carried upon the axle housing adjacent the wheel hub and is held from normally engaging that portion of the clutch upon the latter by a suitable spiral spring 9 installed intermediate of the internal annular shoulder of the gear and cone and the annular rim or flange 10 formed upon the inner end of the sleeve 8. Back of the wheel and cone 6—7 and intermediate of it and the housing member 11 is installed a rotatable cam disc member 12, said member being graduated in thickness circumferentially to properly coincide with the similarly shaped inner hub face of the housing 11.

By this construction it will be seen that the spring 9 will keep the cone clutch back away from engagement with its cooperative female member against the housing 11 and when the cam member 12 is partially rotated in the proper direction it will force cooperative engagement with the two parts of the clutch.

A vertically disposed elongated fabricated metal frame 13 is mounted over the gear wheel 7, it having slots in both side members thereof approximately the width of the gear wheel and in which the opposite peripheral edges of the wheel are housed or surrounded to prevent lateral movement of the frame independently of the gear, and the inner face of the slot of the forward one of said members is toothed as at 37 to form a vertically disposed rack in which the cogs of the gear 7 are permanently meshed so that by a partial rotation of said gear the frame 13 will be thrust downwardly with the shoe 14 at the lower end thereof engaging the ground just inwardly of the tread of the wheel 2 and the instant such engagement occurs the wheel will be raised from contact with the ground, thus causing the car to be jacked up as it were upon the shoes 14.

At 15 I have illustrated a rod leading from the cam lever 16 to which it is pivotally attached as at 17 to a transverse shaft 18 mounted in the chassis 19 of the vehicle and to which it is attached by means of a suitable upstanding crank arm 20.

This shaft 18 is designed to be rotated by the service brake lever 22 which is mounted upon a suitable shaft 23 and has an arm 24 extending obliquely therefrom which is connected to a suitable crank arm on the shaft 18 by the link 25.

The ends of the shoe 14 extend both fore and aft of said members 13 of the brake beam and are suitably braced therefrom as by links indicated at 26 and the shoe is so united to the lower end of the frame that it may be readily removed for repair or renewal. At the forward side member of the braking frame as at 27, I have pivotally attached a rod 28 leading forwardly of the vehicle to a suitable attaching member shown at 29 where it is pivotally connected to prevent the frame from being drawn backwardly when engaging the ground during the forward motion of the car. This brake is not supposed to be actuated by the backward motion of the car, but to provide for its use at such time a radially disposed arm 34 is formed integral with the inner side of the gear wheel 7 and extends upwardly therefrom. To this arm is attached a flexible member 30 which leads to the depending crank arm 31 carried upon the transverse shaft 32 which is manually operated by the emergency lever 21, the flexibility of said member being to provide for free action of the wheel 7 by the forward motion of the car when desired. Thus when desired, as for example during a backward motion of the car, the brake may be thrown into action by a forward rotation of the gear 7 independently of the wheels of the car.

The braking frame 13 together with its shoes is normally held in its uppermost position free from engagement with the ground and held apart therefrom by a suitable horizontally disposed leaf spring 33 attached to the under side of the arcuately shaped upper end thereof, the inner end of the spring being attached to the chassis of the vehicle in any desired manner. The spring is provided with sufficient resiliency to permit of the entire frame being depressed by the action of the rotation of the wheel, as previously described.

It is to be understood that while I have shown one embodiment of my invention, that certain of the details thereof may be modified without departing from the spirit of the invention, provided they are kept within the scope of the following claims.

1. The combination with a vehicle having vertically suspended ground engaging shoes adjacent the wheels of said vehicle and means cooperatively engageable intermediate of the wheels and shoe whereby forward motion of the former may be employed in applying the latter as a brake, and means whereby the brake may be applied independently of the motion of the wheels.

2. The combination with a vehicle of the class described, of a vertically operated ground engaging shoe adjacent each rear wheel thereof, a friction clutch intermediate of each shoe and its respective wheel whereby the rotation of the latter may be caused to apply the former, and means whereby said last mentioned means may be engaged or disengaged manually.

3. An auxiliary brake for an automobile comprising in combination a cone clutch, one member of which is attached to the innermost side of the hub of a wheel of the vehicle, the other member of the clutch having a rotative cog member attached thereto and normally held stationary on the vehicle adjacent said wheel, a vertically suspended frame having one side member thereof in constant engagement with the cogged portion of the clutch, a ground engaging shoe attached to the lower end of the frame, means for yieldably holding the frame in its uppermost normal position and means for manually causing the two parts of the clutch to become engaged whereby the rotation of the wheel will cause the shoe to become engaged with the ground and simultaneously lift the wheel from engagement therewith.

4. The combination with a vehicle of the class described, of a vertically operated ground engaging shoe adjacent each rear wheel thereof, a friction clutch intermediate of each shoe and its respective wheel whereby the rotation of the latter may be caused to apply the former, and a manually controlled rotatable cam cooperatively connected with each clutch for engaging and disengaging same.

In testimony whereof I hereunto affix my signature in the presence of two witnesses.

BERNHARD O. FREDERICK.

Witnesses:
S. C. BRONSON,
S. GEO. STEVENS.